US006597338B2

(12) United States Patent
Onodera

(10) Patent No.: US 6,597,338 B2
(45) Date of Patent: *Jul. 22, 2003

(54) LIQUID CRYSTAL DISPLAY

(75) Inventor: Susumu Onodera, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,245

(22) Filed: Jan. 7, 1999

(65) Prior Publication Data

US 2002/0057252 A1 May 16, 2002

(30) Foreign Application Priority Data

Jan. 7, 1998 (JP) .......................................... 10-001228

(51) Int. Cl.[7] .......................... G09G 3/36; G02F 1/1335

(52) U.S. Cl. ......................................... 345/102; 349/61

(58) Field of Search ............................. 345/63, 84, 87, 345/98, 102, 112, 126, 147, 150; 348/61, 578, 678; 377/45, 118, 125; 349/61; 713/321, 340

(56) References Cited

U.S. PATENT DOCUMENTS 5,272,327 A * 12/1993 Mitchell et al. ............ 250/205
5,315,695 A * 5/1994 Saito et al. ................. 345/432
5,406,305 A * 4/1995 Shimomura et al. ........ 345/102
5,493,685 A * 2/1996 Zenda ........................ 713/340
5,636,041 A * 6/1997 Pearce et al. ................. 349/61
5,708,453 A * 1/1998 Tsuchida et al. .............. 345/87
5,760,760 A * 6/1998 Helms ........................ 345/102
5,933,130 A * 8/1999 Wagner ...................... 345/147
6,078,361 A * 6/2000 Reddy ........................ 348/558

FOREIGN PATENT DOCUMENTS

JP 5-33195 4/1993 ............ G09G/3/18
JP 5-173108 7/1993 ........... G02F/1/133
JP 5-236400 9/1993 ............ H04N/5/66
JP 6-34946 2/1994 ........... G02F/1/133
JP 6-102484 4/1994 ........... G02F/1/133
JP 6-47989 6/1994 ............ G09G/3/36
JP 6-160811 6/1994 ........... G02F/1/133
JP 7-38829 2/1995 ............ H04N/5/74
JP 8-179276 7/1996 ........... G02F/1/133
JP 8-237580 9/1996 ............ H04N/5/66

OTHER PUBLICATIONS

Japanese Office Action dated May 16,2000 with partial translation.
Japanese Office Action dated May 16, 2000 with partial English translation.

* cited by examiner

*Primary Examiner*—Bipin Shalwala
*Assistant Examiner*—Jeff Pizial
(74) *Attorney, Agent, or Firm*—McGinn & Gibb, PLLC

(57) ABSTRACT

A liquid crystal display in which the construction of an inverter is not complex and which can change the luminance wider than the changeable range of regulating light of the inverter is provided. An image is formed at a display control circuit and the gradations of the image is converted at a luminance regulating circuit and the converted image is inputted to a liquid crystal display section. The liquid crystal display section displays the image on a panel controlling by image data inputted a backlight which is controlled by changing an effective value of a tube current in an inverter. The luminance regulating circuit controls display gradations responding to a user setting value.

17 Claims, 4 Drawing Sheets

(a) GRADATION VALUE 58

(b) GRADATION VALUE 29

FIG. 6

| USER SETTING VALUE | INVERTER SETTING VALUE | ARITHMETIC CIRCUIT SETTING VALUE |
|---|---|---|
| 0 | 0 | −64 |
| 1 | 0 | −56 |
| 2 | 0 | −48 |
| 3 | 0 | −40 |
| 4 | 0 | −32 |
| 5 | 0 | −24 |
| 6 | 0 | −16 |
| 7 | 0 | −8 |
| 8 | 0 | 0 |
| 9 | 1 | 0 |
| 10 | 2 | 0 |
| 11 | 3 | 0 |
| 12 | 4 | 0 |
| 13 | 5 | 0 |
| 14 | 6 | 0 |
| 15 | 7 | 0 |

LIQUID CRYSTAL DISPLAY

BACKGROUND OF THE INVENTION

The present invention relates to a liquid crystal display which in particular regulates the light of a backlight of a personal computer using a regulating current type inverter.

DESCRIPTION OF THE RELATED ART

As shown in FIG. 1, a conventional liquid crystal display is constituted of a display control circuit 1, a liquid crystal display section 3, a backlight 4 and an inverter 5.

At the above mentioned construction, the display control circuit 1 displays the display contents which the personal computer (the personal computer is not described in FIG. 1) indicates to display on the liquid crystal display section 3. In this case, the liquid crystal display section 3 makes the adjustment of the display luminance possible by regulating the backlight by the inverter 5.

The Japanese Patents Laid-Open Publication No. HEI 6-34946 and HEI 8-179276 disclose the method which controls the backlight using a regulating current type inverter.

In the above mentioned conventional type liquid crystal display, at the case that the backlight of the liquid crystal display is turned on by the regulating current type inverter, the stability of fluorescent lamp is required while the light is on and the current must not be decreased below a certain level. Therefore, there is a problem that a user can not make the display luminance dark being below a certain level, even the user wants to have such a dark display luminance.

In this case, it is possible that a PWM (pulse width modulation) type inverter makes the display luminance darker, however the inverter circuit becomes complex.

SUMMARY OF THE INVENTION

It is therefore an object of the present invention to provide a liquid crystal display which solves the above mentioned problem and makes not the construction of the inverter complex and makes the change of the display luminance being wider than the regulating light range of the inverter possible.

The liquid crystal display of the present invention provides a luminance regulating means which regulates the light of the backlight disposed at the back of the liquid crystal display section using a regulating current type inverter and controls the display luminance of display data of the liquid crystal display section by changing the gradations of display data to be displayed on the liquid crystal section low responding to an external instruction.

That is, the liquid crystal display of the present invention makes the regulation of display brightness possible by not changing the brightness of the backlight in the liquid crystal display and by implementing the operation for the image signal data.

Concretely, the display luminance is regulated by the backlight whose regulating light is controlled by an inverter for the liquid crystal display section. The liquid crystal display section displays the image signals formed at a display control circuit and made the display gradations low at the luminance regulating circuit. With this, it is possible that the display luminance is controlled wider than the possible range of the regulating light by the backlight of the liquid crystal display.

According to a first aspect of the present invention, for achieving the above mentioned objects, at a liquid crystal display which regulates the light of a backlight disposed at the back of a liquid crystal display section using a regulating current type inverter, there is provided a luminance regulating means for controlling a display luminance of display data at said liquid crystal display section, by changing gradations of the display data displaying on said liquid crystal display section to low values responding to an external instruction.

According to a second aspect of the present invention, at the liquid crystal display, said luminance regulating means provides a shift means for shifting said display data and a switching means which selects either an output of said shift means or said display data responding to said external instruction and outputs the selected one on said liquid crystal display section.

According to a third aspect of the present invention, at the liquid crystal display, said luminance regulating means is constructed to implement the control of said regulating current type inverter working together with the control of said display luminance.

According to a fourth aspect of the present invention, at the liquid crystal display, said luminance regulating means provides a luminance setting means which outputs the switching instruction for said switching means and the regulating light instruction for said regulating current type inverter responding to said external instruction.

According to a fifth aspect of the present invention, at the liquid crystal display, said luminance regulating means provides an arithmetic calculation means which operates said display data with a setting value responding to said external instruction.

According to a sixth aspect of the present invention, at the liquid crystal display, said luminance regulating means is constructed to implement the control of said regulating current type inverter working together with the control of said display luminance.

According to a seventh aspect of the present invention, at the liquid crystal display, said luminance regulating means provides a control means for controlling said arithmetic calculation means and said regulating current type inverter respectively responding to said external setting value.

BRIEF DESCRIPTION OF THE DRAWINGS

The objects and features of the present invention will become more apparent from the consideration of the following detailed description taken in conjunction with the accompanying drawings in which:

FIG. 6 is a setting value example of an operating panel shown in FIG. 5.

DESCRIPTION OF THE PREFERRED EMBODIMENTS

Figure 1:
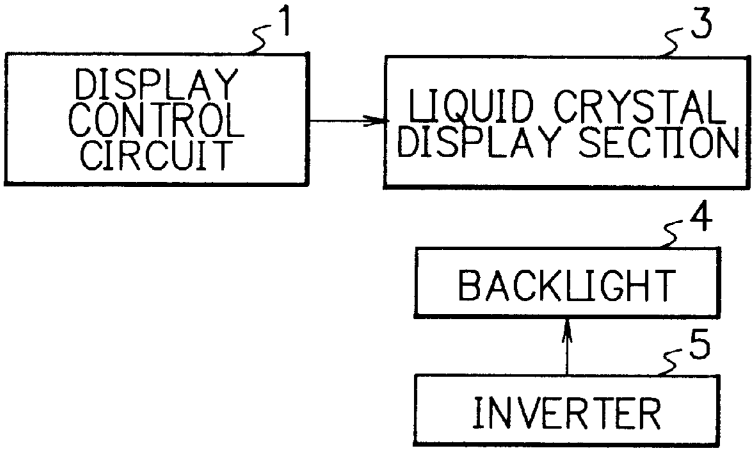
FIG. 1 PRIOR ART
FIG. 1 is a block diagram showing the construction of the conventional liquid crystal display.
Figure 2:
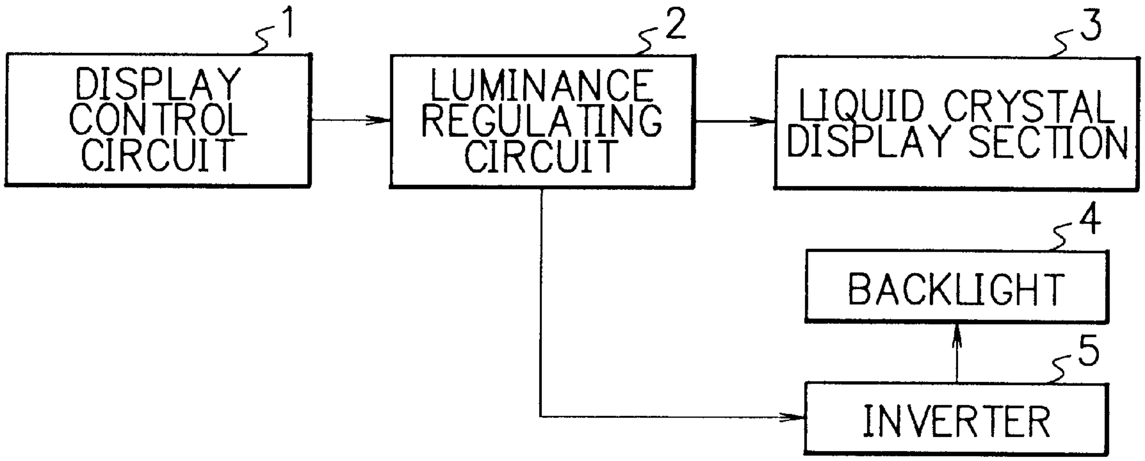
FIG. 2 is a block diagram showing a first example of embodiments of the construction of the liquid crystal display of the present invention.

Referring now to the drawings, embodiments of the present invention are explained in detail. FIG. 2 is a block diagram showing a first example of embodiments of the construction of the liquid crystal display of the present invention. In FIG. 2, the liquid crystal display of the present invention is constituted of a display control circuit 1, a luminance regulating circuit 2, a liquid crystal display section 3, a backlight 4 and an inverter 5.

The difference between the present invention and the conventional type is that the luminance regulating circuit 2 is newly added to the present invention and the other functions such as the display control circuit 1, the liquid crystal display section 3, the backlight 4 and the inverter 5 are almost the same as the conventional type.

In the present invention, images are formed in the display control circuit 1 and the gradations of the images are converted at the luminance regulating circuit 2 and the images are inputted to the liquid crystal display section 3. The backlight 4 is controlled by changing the effective value of the tube current in the inverter 5. The liquid crystal display section 3 controls the light from the backlight 4 by the inputted image data and displays the images on the panel (this panel is not described in Fig.). The luminance regulating circuit 2 controls the display gradations responding to the user setting value.

Figure 3:
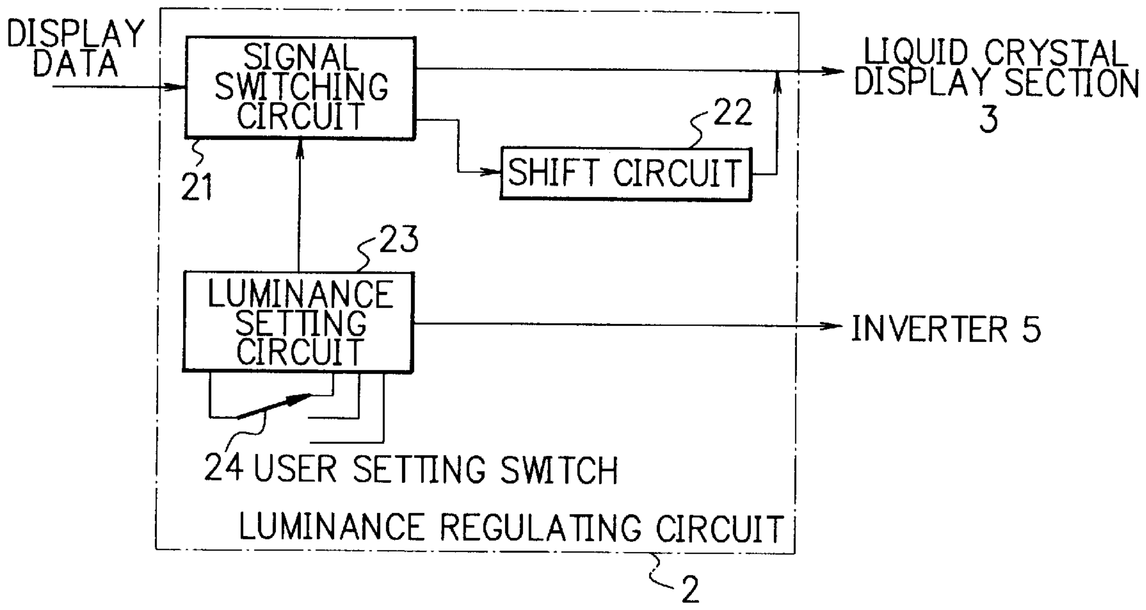
FIG. 3 is a block diagram showing the construction of a luminance regulating circuit shown in FIG. 2.

FIG. 3 is a block diagram showing the construction of the luminance regulating circuit 2 shown in FIG. 2. In FIG. 3, the luminance regulating circuit 2 is constituted of a signal switching circuit 21, a shift circuit 22, a luminance setting circuit 23 and a user setting switch 24.

The signal switching circuit 21 switches the output of the inputted image signals to the liquid crystal display section 3 directly or to the liquid crystal display section 3 through the shift circuit 22, responding to the control signal from the luminance setting circuit 23.

At the case that the image signals are outputted through the shift circuit 22, the image signals shifted 1 bit are outputted. The luminance setting circuit 23 controls the operation of the signal switching circuit 21 and the inverter 5, responding to the set value by the user setting switch 24.

At an example of the embodiments of the present invention, the 3 steps of luminance is able to be set by the user setting switch 24. At the case that the first setting value being the lightest value is set by the user setting switch 24, the luminance setting circuit 23 instructs the signal switching circuit 21 that the image signals are outputted directly to the liquid crystal display section 3 and also instructs the inverter 5 to make the luminance the lightest value.

At the case that the second setting value being the middle brightness is set by the user setting switch 24, the luminance setting circuit 23 instructs the signal switching circuit 21 that the image signals are outputted directly to the liquid crystal display section 3 just the same as the first setting and instructs the inverter 5 to make the luminance the darkest value.

At the case that the third setting value being the darkest value is set by the user setting switch 24, the luminance setting circuit 23 instructs the signal switching circuit 21 that the image signals are outputted through the shift circuit 22 to the liquid crystal display section 3 and instructs the inverter 5 to make the luminance the darkest value just the same as the second setting.

In the first example of the embodiments of the present invention, it is explained that the gradations of the image display data is controlled by the shift circuit 22, however another calculation method is applicable to make the gradations low. For example, it is applicable that an arbitrary numerical value is subtracted from the inputted display data or the inputted display data are divided by an arbitrary numerical value.

Referring to FIGS. 2 and 3, the operation of an example of the embodiments of the liquid crystal display of the present invention is explained. The image signals formed at the display control circuit 1 are inputted to the liquid crystal display section 3 through the luminance regulating circuit 2 and the image responded to the image signals is displayed.

In this case, by changing the user setting switch 24 responding to the desire of the user, the luminance regulating circuit 2 can change the display luminance in 3 steps. At the two light settings (the first and second setting values), the image signals formed at the display control circuit 1 are displayed as they are without any operation at the luminance regulating circuit 2, the display luminance is controlled only by the tube current control at the inverter 5.

At the darkest case (the third setting value), making the quantity of the tube current the same value as the second setting value, the image signals are switched at the signal switching circuit 21 to the shift circuit 22 and outputted to the liquid crystal display section 3.

The data of image signals are shifted one bit at the shift circuit 22 and the original gradation value is converted to a half gradation value and the image signals are outputted to the liquid crystal display section 3, the display being darker than the second setting value is obtained.

Figure 4:
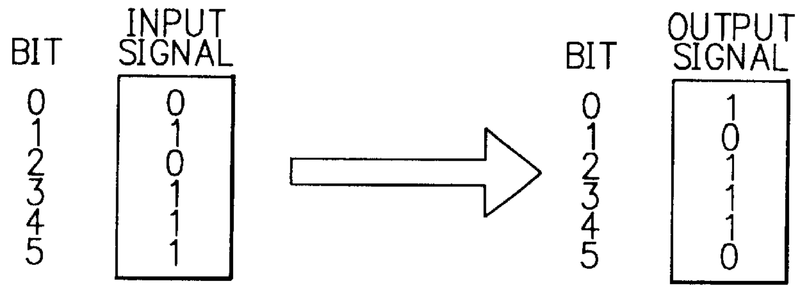
FIG. 4 is an operation diagram of a shift circuit shown in FIG. 3.

FIG. 4 is an operation diagram of the shift circuit 22 shown in FIG. 3. In FIG. 4, the image signals which are six bits, in other words expressable in 64 gradations are shifted one bit to the LSB(least significant bit) direction in the shift circuit 22. For example, at the case that the input image signal is the gradation value 58 "111010", the image signal of the gradation value 29 "011101" is outputted.

At the first example of the embodiments of the liquid crystal display of the present invention, the case used monochromatic signals is explained, however the present invention is applicable for color signals using three routes of the same circuits. Moreover, the display data are explained using six bits, however it is possible to use arbitrary bit numbers for the display data.

Figure 5:
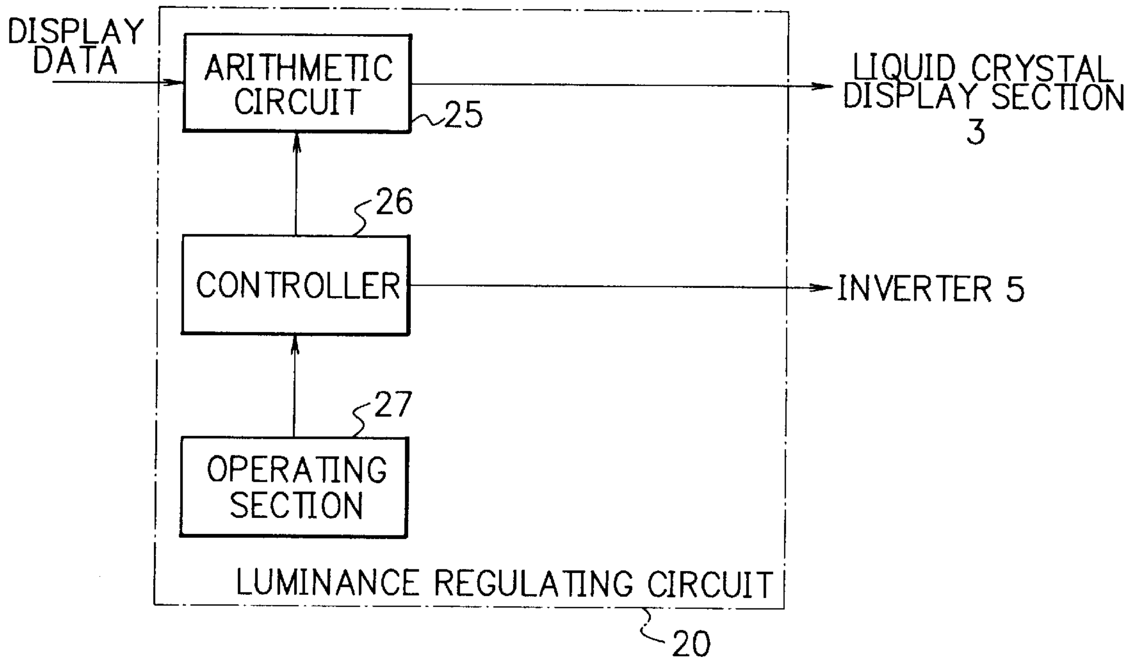
FIG. 5 is a block diagram showing a second example of embodiments of the construction of the luminance regulating circuit of the liquid crystal display of the present invention.

FIG. 5 is a block diagram showing a second example of the embodiments of the construction of the luminance regulating circuit of the liquid crystal display of the present invention. In FIG. 5, a luminance regulating circuit 20 is constituted of an arithmetic circuit 25, a controller 26 and an operating section 27. In the second example, the construction of the luminance regulating circuit 20 is different from the first example of the embodiments of the present invention and the other parts are the same as the first example shown in FIG. 2 and the operation is also the same as the first example. Therefore, the same explanation is omitted.

In the second example, the arithmetic circuit 25 is provided replacing the signal switching circuit 21 and the shift circuit 22 of the first example. At the time when a user sets a desiring luminance in the operating section 27, the controller 26 controls the inverter 5 and the arithmetic circuit 25 responding to the setting.

The operating section 27 can set the sixteen steps of the luminance from 0 to 15 and the inverter 5 can regulate the backlight 4 in the eight steps from 0 to 7. At the arithmetic circuit 25, a setting value (an arbitrary integer) can be added to the six bits input display data.

FIG. 6 is a setting value example of the operating section 27 shown in FIG. 5. Responding to the user setting value shown in FIG. 6 in the operating section 27, the controller 26 controls to set an inverter setting value in the inverter 5 and set an arithmetic setting value in the arithmetic circuit 25 respectively, with this operation the user desirable display luminance is able to be obtained.

That is, at the time when the values "0" to "7" are set in the user setting value, the arithmetic circuit setting values "−64", "−56", "−48", "−40", "−32","−24", "−16" and "−8" are set in the arithmetic circuit 25. At this time, an inverter setting value "0" is set in the inverter 5.

At the time when the values "9" to "15" are set in the user setting value, the inverter setting values "1" to "7" are set in the inverter 5. At this time, the arithmetic circuit setting value "0" is set in the arithmetic circuit 25. At the time when the value "8" is set in the user setting value, the inverter setting value "0" is set in the inverter 5 and the arithmetic circuit setting value "0" is set in the arithmetic circuit 25.

At the second example of the embodiments of the liquid crystal display of the present invention, the case used monochromatic signals is explained, however the present invention is applicable for color signals using three routes of the same circuits. Moreover, the display data are explained using six bits, however it is possible to use arbitrary bit numbers for the display data.

As explained above, in the first example of the embodiments of the present invention by the operation of the luminance setting circuit 23 in the luminance regulating circuit 2, making the gradation value of the display data from the display control circuit 1 a half, it is possible that the luminance is changeable more than the regulating light range of the inverter 5.

As mentioned above, at the liquid crystal display which the regulating light of the backlight disposed at the back of the liquid crystal display section is implemented by the regulating current type inverter, the gradations of the display data displayed on the liquid crystal display section are changed responding to the external instruction and the display luminance of the display data at the liquid crystal display section is controlled, therefore without making the construction of the inverter complex, that the luminance is changeable more than the regulating light range of the inverter is able to be obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A liquid crystal display having a regulating current type inverter for controlling a backlight, comprising:

a luminance regulating circuit for controlling a display luminance, said luminance regulating circuit comprising:

a user setting switch for inputting a user control instruction;

a luminance setting circuit which simultaneously outputs a regulating light instruction for controlling said regulating current type inverter and a switching instruction for controlling a gradation value of digital display data, based on a single user control instruction;

a shift circuit which reduces a gradation value of said digital display data; and a switching circuit which, based upon said switching instruction, selects one of outputting digital display data directly to a liquid crystal display section and outputting digital display data through said shift circuit to said liquid crystal display section, wherein said single user control instruction comprises other than an on/off instruction.

2. The liquid crystal display in accordance with claim 1, wherein said shift circuit reduces a gradation value of digital display data by 1 bit.

3. The liquid crystal display in accordance with claim 1, wherein said luminance regulating circuit implements control of said regulating current type inverter working together with a control of said digital display data.

4. The liquid crystal in accordance with claim 2, wherein said regulating current type inverter controls a brightness of said backlight based on said regulating light instruction.

5. The liquid crystal display in accordance with claim 2, wherein said luminance setting circuit outputs a switching instruction causing said switching circuit to output digital display data through said shift circuit to said liquid crystal display section, and outputs a regulating light instruction causing said regulating current type inverter to make a backlight have a darkest value.

6. A liquid crystal display having a regulating current type inverter for controlling a backlight, comprising:

a luminance regulating circuit for controlling a display luminance, said luminance regulating circuit comprising:

an operating section for inputting a user control instruction;

an arithmetic circulation circuit which adjusts a gradation value of digital display data based on an arithmetic setting value; and a controller which simultaneously controls said arithmetic setting value and an inverter setting value in said regulating current type inverter, based on a single user control instruction, wherein said single user control instruction comprises other than an on/off instruction.

7. The liquid crystal display in accordance with claim 6, wherein said luminance regulating circuit implements control of said regulating current type inverter working together with a control of said digital display data.

8. The liquid crystal display in accordance with claim 7, wherein said operating section has a user setting values ranging from 0 to 15, said regulating current type inverter has inverter setting values ranging from 0 to 7, and said arithmetic circuit has arithmetic circuit setting values ranging from −64 to 0.

9. The liquid crystal display according to claim 1, wherein said luminance regulating circuit adjusts said digital display data in conjunction with controlling said inverter.

10. The liquid crystal display according to claim 1, wherein said luminance regulating circuit simultaneously reduces a gradation value of said digital display data and instructs said inverter to make darkest display luminance based on a single user control instruction.

11. The liquid crystal display according to claim 1, wherein said display luminance is changeable by an amount which is greater than a regulating light range of said regulating current type inverter.

12. The liquid crystal display according to claim 1, wherein said luminance regulating circuit provides a coordinated control of said digital display data and said inverter.

13. A liquid crystal display having a regulating current type inverter for controlling a backlight, comprising:

a luminance regulating circuit comprising:

a user setting switch for inputting a user control instruction;

a luminance setting circuit which is coupled to said user setting switch, and which simultaneously outputs a regulating light instruction for controlling said regulating current type inverter and a switching instruction for controlling a gradation value of digital display data, based on a single user control instruction;

a shift circuit which reduces a gradation value of said digital display data; and a switching circuit which is coupled to said luminance setting circuit and which, based upon said switching instruction, selects one of outputting digital display data directly to a liquid crystal display section and outputting digital display data through said shift circuit to said liquid crystal display section, wherein said single user control instruction comprises other than an on/off instruction.

14. The liquid crystal display according to claim 13, wherein said user setting switch comprises a brightest setting which causes said luminance setting circuit to instruct said switching circuit to output digital display data directly to said liquid crystal display section, and causes said luminance setting circuit to instruct said inverter to make said backlight have a brightest value.

15. The liquid crystal display according to claim 13, wherein said user setting switch comprises a darkest setting which causes said luminance setting circuit to instruct said switching circuit to reduce a gradation value of said digital display data, and causes said luminance setting circuit to instruct said regulating current type inverter to make said backlight have a darkest value.

16. The liquid crystal display according to claim 13, wherein said display luminance has a range from brightest to darkest which is greater than a regulating light range of said regulating current type inverter.

17. The liquid crystal display according to claim 13, wherein a display luminance has a range which is greater than a regulating light range of said backlight.

* * * * *

UNITED STATES PATENT AND TRADEMARK OFFICE

CERTIFICATE OF CORRECTION

PATENT NO. : 6,597,338 B2
APPLICATION NO. : 09/226245
DATED : July 22, 2003
INVENTOR(S) : Susumu Onodera It is certified that error appears in the above-identified patent and that said Letters Patent is hereby corrected as shown below:

Column 6, line 29, please replace “an arithmetic circulation...” with “an arithmetic calculation...”

Signed and Sealed this
Fifth Day of April, 2011

David J. Kappos
*Director of the United States Patent and Trademark Office*